(12) United States Patent
Satoh et al.

(10) Patent No.: US 7,414,596 B2
(45) Date of Patent: Aug. 19, 2008

(54) DATA CONVERSION METHOD AND APPARATUS, AND ORIENTATION MEASUREMENT APPARATUS

(75) Inventors: Kiyohide Satoh, Kanagawa (JP); Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 10/952,876

(22) Filed: Sep. 30, 2004

(65) Prior Publication Data
US 2005/0068293 A1      Mar. 31, 2005

(30) Foreign Application Priority Data
Sep. 30, 2003   (JP)  ............................ 2003-341630

(51) Int. Cl.
G09G 5/00      (2006.01)
H04N 7/00      (2006.01)

(52) U.S. Cl. ............................... 345/8; 345/9; 345/158; 348/42; 348/116; 348/135

(58) Field of Classification Search ......... 345/156–171, 345/7–9; 348/40, 42, 46, 116, 135
See application file for complete search history.

(56) References Cited

U.S. PATENT DOCUMENTS

| 6,956,503 | B2 | 10/2005 | Yokokohji ............... 340/988 |
| 2002/0075286 | A1 | 6/2002 | Yonezawa et al. ........... 345/679 |
| 2003/0080976 | A1 | 5/2003 | Satoh et al. ............... 345/629 |
| 2003/0137524 | A1 | 7/2003 | Anabuki et al. ............ 345/633 |
| 2004/0066417 | A1 | 4/2004 | Anabuki et al. ............ 345/848 |

FOREIGN PATENT DOCUMENTS

| CN | 1375741 | 10/2002 |
| CN | 1413566 | 4/2003 |
| DE | 19539367 A1 | 4/1997 |
| EP | 0 930 512 | 7/1999 |
| GB | 2 376 397 | 12/2002 |
| JP | 2003-132374 | 5/2003 |
| WO | 01/56007 | 8/2001 |
| WO | 02/37827 | 5/2002 |

OTHER PUBLICATIONS

Tobias Höllerer, et al., "Situated Documentaries: Embedding Multimedia Presentations in The Real World", Proceedings of ISWC '99 (International Symposium on Wearable Computers), San Francisco, CA, Oct. 18-19, 1999, pp. 79-86.

*Primary Examiner*—Henry N Tran
(74) *Attorney, Agent, or Firm*—Fitzpatrick, Cella, Harper & Scinto

(57) ABSTRACT

An orientation sensor measures the orientation of the orientation sensor itself on a sensor coordinate system, and outputs an orientation measurement value. A first alignment data setting unit reads out first alignment data, which is recorded in an external storage device and represents the gravitational direction on a reference coordinate system, and sets that data in an orientation calculation unit. A second alignment data setting unit sets second alignment data, which represents a difference angle in the azimuth direction between the sensor coordinate system and reference coordinate system in the orientation calculation unit in accordance with a command input by an operator from a command input unit. The orientation calculation unit calculates the orientation of an object on the reference coordinate system using the first and second alignment data on the basis of the orientation measurement value input from the orientation sensor, and outputs it.

7 Claims, 9 Drawing Sheets

DATA CONVERSION METHOD AND APPARATUS, AND ORIENTATION MEASUREMENT APPARATUS

FIELD OF THE INVENTION

The present invention relates to a technique for measuring the orientation of an object using an orientation sensor.

BACKGROUND OF THE INVENTION

In recent years, studies about mixed reality (MR) that aims at seamless joint of physical and virtual spaces have been extensively made. An image display apparatus which presents mixed reality is implemented by an apparatus which superimposes an image of a virtual space (e.g., a virtual object, text information, and the like rendered by computer graphics) onto an image of a physical space captured by an image sensing device such as a video camera or the like.

As applications of such image display apparatus, navigation that superimposes the names and information of famous buildings and the like as virtual space images in an image of a physical space obtained by capturing an urban area, a landscape simulation that superimposes a computer graphics image of a building which is planned to be constructed onto an image obtained by capturing a planned construction site of that building, and the like are expected.

A common requirement for these applications involves the precision level of registration between the physical and virtual spaces, and many efforts have been conventionally made in this respect. In order to attain accurate registration between the physical and virtual spaces, camera parameters (intrinsic and extrinsic parameters) required to generate an image on the virtual space can be always matched with those of an image sensing device. If intrinsic parameters of the image sensing device are known, a problem of registration in mixed reality eventuates in a problem of calculating extrinsic parameters of the image sensing device, i.e., the position and orientation of the image sensing device on a reference coordinate system set on the physical space.

As a method of calculating the position and orientation of an image sensing device on the reference coordinate system set on the physical space, for example, T. Höllerer, S. Feiner, and J. Pavlik, Situated documentaries: embedding multimedia presentations in the real world, Proc. International Symposium on Wearable Computers '99, pp. 79-86, 1999. has proposed a technique for acquiring the position and orientation of an image sensing device using orientation measurement of an image sensing device using an orientation sensor and position measurement of an image sensing device by a global positioning system or the like in combination.

As typical orientation sensors used in such method, TISS-5-40 (TOKIMEC INC.) and InertiaCube2 (InterSense Inc.) are available. Each of these orientation sensors mainly comprises gyro sensors for detecting angular velocities in triaxial directions, and acceleration sensors for detecting accelerations in the triaxial directions, and measures the triaxial orientation values (azimuth angle, pitch angle, roll angle) as a combination of these measurement values. In general, angle information obtained by the gyro sensor alone is only a relative change in orientation with respect to an orientation at a given time. However, these orientation sensors are characterized in that the gravitational direction of the earth is measured using the acceleration sensors to obtain the absolute angles with reference to the gravitational direction as tilt angles (i.e., pitch and roll angles).

Orientation measurement values output from the orientation sensor represent the orientation of the sensor itself on a sensor coordinate system defined by the sensor itself irrespective of a reference coordinate system. The sensor coordinate system is defined to have the gravitational direction (down direction) as a Z-axis, and a direction in front of a sensor upon initializing the sensor on an X-Y plane specified by this Z-axis as an X-axis, in case of, e.g., TISS-5-40 above. In case of InertiCube2, the sensor coordinate system is defined to have the gravitational direction (down direction) as a Z-axis, and a north direction indicated by a built-in geomagnetic sensor upon initializing the sensor on an X-Y plane specified by this Z-axis as an X-axis. In this way, the orientation measurement values of the orientation sensor do not normally indicate the orientation itself of an object to be measured (an image sensing device in case of an image display apparatus that presents mixed reality) on the reference coordinate system as information to be acquired.

That is, the orientation measurement values of the orientation sensor cannot be directly used as the orientation of the object to be measured on the reference coordinate system, and must undergo some kind of coordinate conversion. More specifically, coordinate conversion that converts the orientation of the sensor itself into that of the object to be measured, and coordinate conversion that converts the orientation of the object to be measured on the sensor coordinate system into that on the reference coordinate system are required.

In this specification, data required to perform coordinate conversion that converts the orientation of the sensor itself into that of the object to be measured will be referred to as offset data hereinafter. Also, data required to perform coordinate conversion that converts the orientation of the object to be measured on the sensor coordinate system into that on the reference coordinate system will be referred to as alignment data hereinafter.

The prior art of an orientation measurement method that measures the orientation of an object to be measured using an orientation sensor which can measure tilt angles as the absolute angles with reference to the gravitational direction will be explained below taking a general image display apparatus that presents mixed reality as an example. Especially, the conventional setting method and use method of alignment data will be explained.

FIG. 1 is a block diagram showing the arrangement of a general image display apparatus which presents mixed reality.

A camera 110, display unit 120, and orientation sensor 130 are fixed to a head-mount unit 100.

The orientation sensor 130 measures the orientation of the orientation sensor 130 itself on the sensor coordinate system, and outputs orientation measurement values of three degrees of freedom. The orientation sensor 130 comprises, e.g., TISS-5-40 or InertiaCube2.

An orientation calculation unit 140 receives the orientation measurement values from the orientation sensor 130, applies coordinate conversion to the orientation measurement values in accordance with alignment data and offset data held by an internal memory (not shown) to calculate the orientation of the camera 110 on the reference coordinate system, and outputs it to an image generation unit 150 as orientation information.

The image generation unit 150 generates a virtual image corresponding to the position and orientation of the camera 110 in accordance with the orientation information input from the orientation calculation unit 140 and position information of the camera 110 on the reference coordinate system, which is input from a position calculation unit (not shown:

e.g., a receiver of a global positioning system), and outputs that image by superimposing it onto an actually captured image input from the camera 110. The display unit 120 receives the image output from the image generation unit 150, and displays it.

With the above arrangement, an observer (not shown: i.e., a person who wears the head-mount unit 100) observes a composite image of the actually captured image (an image of the physical space) and virtual image (an image of the virtual space), which is displayed on the display unit 120 arranged in front of his or her eyes.

The method of calculating the orientation of the camera 110 on the reference coordinate system by the orientation calculation unit 140 will be described below using FIG. 2.

Initially, variables in FIG. 2 will be explained.

$R_{WV}$: the orientation of the camera 110 on a reference coordinate system 200 (a coordinate system fixed to the physical space)

$R_{WT}$: the orientation of a sensor coordinate system 210 on the reference coordinate system 200

$R_{TS}$: the orientation of the orientation sensor 130 on the sensor coordinate system 210

$R_{SV}$: the orientation of the camera 110 from the perspective of the orientation sensor 130

In this specification, the orientation of an object B on a coordinate system A is described by a 3×3 matrix $R_{AB}$ where $R_{AB}$ is a coordinate conversion matrix from a coordinate system B defined by the object B into the coordinate system A, and defines a conversion formula $P_A = R_{AB} \cdot P_B$ that converts coordinates $P_B = (X_B, Y_B, Z_B)^T$ on the coordinate system B into coordinates $P_A = (X_A, Y_A, Z_A)^T$ on the coordinate system A. That is, the orientation $R_{WV}$ of the camera 110 on the reference coordinate system 200 can be reworded as the coordinate conversion matrix ($P_W = R_{WV} \cdot P_V$) for converting coordinates $P_V = (X_V, Y_V, Z_V)^T$ on the camera coordinate system 200 into coordinates $P_W = (X_W, Y_W, Z_W)^T$ on the reference coordinate system 200.

At this time, the relationship among $R_{WT}$, $R_{TS}$, $R_{SV}$ and $R_{WV}$ can be described by:

$$R_{WV} = R_{WT} R_{TS} R_{SV} \quad (A)$$

In equation (A), $R_{TS}$ corresponds to the input data from the orientation sensor 130 to the orientation calculation unit 140, $R_{WV}$ corresponds to the output data from the orientation calculation unit 140, $R_{SV}$ corresponds to the offset data, and $R_{WT}$ corresponds to the alignment data. The orientation calculation unit 140 calculates $R_{WV}$ based on equation (A) using $R_{TS}$ input from the orientation sensor 130, and $R_{SV}$ and $R_{WT}$ held by the internal memory, and outputs it to the image generation unit 150.

Therefore, in order to attain accurate registration between the physical space and virtual space, accurate $R_{SV}$ and $R_{WT}$ must be set in the internal memory of the orientation calculation unit 140 by some means.

The value of the offset data $R_{SV}$ is always constant as long as the relative orientation relationship between the orientation sensor 130 and camera 100 remains the same. In case of the image display apparatus shown in FIG. 1, since both the orientation sensor 130 and camera 100 are fixed to the head-mount unit 100, the offset data need only be derived only when the orientation sensor 130 and camera 100 are set on the head-mount unit 100. In general, since an object whose orientation is to be measured and an orientation sensor used to measure it are fixed to keep rigidity, the offset data need only be derived only when the orientation sensor is set on the object to be measured.

Likewise, the value of the alignment data $R_{WT}$ is always constant as long as the relative orientation relationship between the reference coordinate system 200 and sensor coordinate system 210 remains the same, and the alignment data need only be derived only when the reference coordinate system 200 is defined. However, in practice, in case of, e.g., TISS-5-40, since the sensor coordinate system 210 is determined depending on the orientation of the orientation sensor 130 upon initializing the sensor, as described above, if the orientation of the orientation sensor 130 upon initializing the sensor differs, the sensor coordinate system 210 differs. In case of InertiaCube2, since the sensor coordinate system 210 is determined depending on the north direction indicated by the geomagnetic sensor upon initializing the sensor, the sensor coordinate system 210 may differ depending on a change in magnetic environment upon initializing the sensor.

For this reason, there is a restriction in use of the once derived alignment data without any change that the orientation sensor 130 must always be initialized in the same orientation or magnetic environment.

As one method free from such restriction, a method described in Japanese Patent Laid-Open No. 2003-132374 (U.S. Pat. Pub. No. 2003/080976 A1) previously filed by the present application is known. This conventional method will be explained below.

If the above restriction is not placed, the definition of the sensor coordinate system 210 changes depending on the orientation, magnetic environment, and the like upon initializing the orientation sensor 130. Therefore, an appropriate value of the alignment data is not constant, and must be derived again every time the orientation sensor 130 is initialized. Since this conventional method facilitates derivation of the alignment data, the orientation can be accurately measured even when the sensor coordinate system 210 has changed.

In general, an orientation sensor which can measure tilt angles as the absolute angles with reference to the gravitational direction has a feature that one of the axes of the sensor coordinate system 210 is set to agree with the gravitational direction (or its inverse direction). For example, in TISS-5-40 or InertiaCube2, the Z-axis of the sensor coordinate system 210 is set to agree with the gravitational direction, as shown in FIG. 3. In the following description, assume that the Z-axis of the sensor coordinate system 210 indicates the gravitational direction.

This conventional method limits the degrees of freedom in design of the reference coordinate system 200 so as to facilitate derivation of alignment data. More specifically, as shown in FIG. 3, only the orientation that can be expressed by rotating the sensor coordinate system 210 in the azimuth direction can be defined as that of the reference coordinate system 200. In other words, the condition that the gravitational direction must always be defined as the Z-axis of the reference coordinate system 200 is placed as a restriction upon designing the reference coordinate system 200.

If the reference coordinate system 200 is designed under such restriction, the Z-axis direction of the reference coordinate system 200 agrees with that of the sensor coordinate system 210. For this reason, the alignment data $R_{WT}$ as data required to convert the orientation on the sensor coordinate system 210 into that on the reference coordinate system 200 can be expressed by a rotation matrix that expresses a rotation in the azimuth direction. In other words, alignment data $R_{WT}$ can be expressed by only one scalar quantity $\phi_{WT}$ that expresses the rotation angle about the Z-axis. That is, $R_{WT}$ is given by:

$$R_{WT} = \begin{bmatrix} \cos\phi_{WT} & -\sin\phi_{WT} & 0 \\ \sin\phi_{WT} & \cos\phi_{WT} & 0 \\ 0 & 0 & 1 \end{bmatrix} \quad (B)$$

As described above, the appropriate value of the alignment data is not constant, and must be re-derived every time the orientation sensor 130 is initialized. With this conventional method, since the alignment data is defined by only $\phi_{WT}$, the value which must be re-derived every time the orientation sensor 130 is initialized is only one scalar quantity $\phi_{WT}$.

For example, after the orientation sensor 130 is initialized, the value $\phi_{WT}$ held by the orientation calculation unit 140 need only be interactively increased/decreased via an input device (not shown) such as a joystick or the like to attain accurate registration between an actually captured image and virtual image while observing an image (formed by superposing the virtual image on the actually captured image) displayed on the display unit 120. This process can be done very easily since only one variable need only be changed, and the degree of freedom of a variable is 1.

In this way, the conventional method allows accurate orientation measurement without placing any restriction that the orientation sensor 130 must always be initialized in the same orientation or magnetic environment, since re-derivation of alignment data is facilitated by limiting the degree of freedom in design of the reference coordinate system 200.

However, this method suffers a program that the reference coordinate system cannot be freely designed. For this reason, the degree of freedom in design of an application is limited. Also, it is difficult to apply this method to an existing application which has a unique reference coordinate system.

SUMMARY OF THE INVENTION

The present invention has been made in consideration of the above problems, and has as its object to allow easy re-derivation of alignment data without placing any restriction on design of a reference coordinate system.

According to an aspect of the present invention, there is provided a data conversion method for converting orientation data on a sensor coordinate system defined by an orientation sensor into orientation data on a reference coordinate system, which is different from the sensor coordinate system, comprising: a first setting step of setting first alignment data which represents a gravitational direction on the reference coordinate system; a second setting step of setting second alignment data indicating a difference angle in an azimuth direction between the sensor coordinate system and reference coordinate system; an input step of inputting orientation data on the sensor coordinate system; and a conversion step of converting the orientation data on the sensor coordinate system input in the input step into orientation data on the reference coordinate system on the basis of data which represents a gravitational direction on the sensor coordinate system, and the first and second alignment data.

According to another aspect of the present invention, there is provided a data conversion method for converting orientation data on a sensor coordinate system defined by an orientation sensor into orientation data on a reference coordinate system, which is different from the sensor coordinate system, comprising: a step of calculating a first coordinate conversion required to adjust a gravitational direction on the sensor coordinate system to a gravitational direction on the reference coordinate system on the basis of the gravitational direction on the reference coordinate system and the gravitational direction on the sensor coordinate system; a step of calculating a second coordinate conversion required to perform difference angle rotation in an azimuth direction between a coordinate value of the sensor coordinate system and the reference coordinate system to have the gravitational direction on the reference coordinate system as a rotation axis; an input step of inputting orientation data on the sensor coordinate system; and a conversion step of converting the orientation data on the sensor coordinate system input in the input step into orientation data on the reference coordinate system using the first and second coordinate conversions.

According to a further aspect of the present invention, there is provided a program making a computer execute a data conversion method of the present invention or a computer readable storage medium storing that program.

According to a further aspect of the present invention, there is provided a data conversion apparatus for converting orientation data on a sensor coordinate system defined by an orientation sensor into orientation data on a reference coordinate system, which is different from the sensor coordinate system, comprising: first setting unit adapted to set first alignment data which represents a gravitational direction on the reference coordinate system; second setting unit adapted to set second alignment data indicating a difference angle in an azimuth direction between the sensor coordinate system and reference coordinate system; input unit adapted to input orientation data on the sensor coordinate system; and conversion unit adapted to convert the orientation data on the sensor coordinate system input by the input unit into orientation data on the reference coordinate system on the basis of data which represents a gravitational direction on the sensor coordinate system, and the first and second alignment data.

According to a further aspect of the present invention, there is provided a data conversion apparatus for converting orientation data on a sensor coordinate system defined by an orientation sensor into orientation data on a reference coordinate system, which is different from the sensor coordinate system, comprising: first calculating unit adapted to calculate a first coordinate conversion required to adjust a gravitational direction on the sensor coordinate system to a gravitational direction on the reference coordinate system on the basis of the gravitational direction on the reference coordinate system and the gravitational direction on the sensor coordinate system; second calculating unit adapted to calculate a second coordinate conversion required to perform difference angle rotation in an azimuth direction between a coordinate value of the sensor coordinate system and the reference coordinate system to have the gravitational direction on the reference coordinate system as a rotation axis; input unit adapted to input orientation data on the sensor coordinate system; and conversion unit adapted to convert the orientation data on the sensor coordinate system input by the input unit into orientation data on the reference coordinate system using the first and second coordinate conversions.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

This embodiment will explain a case wherein the orientation measurement method of the present invention is applied to an image display apparatus that presents mixed reality.

Figure 1:
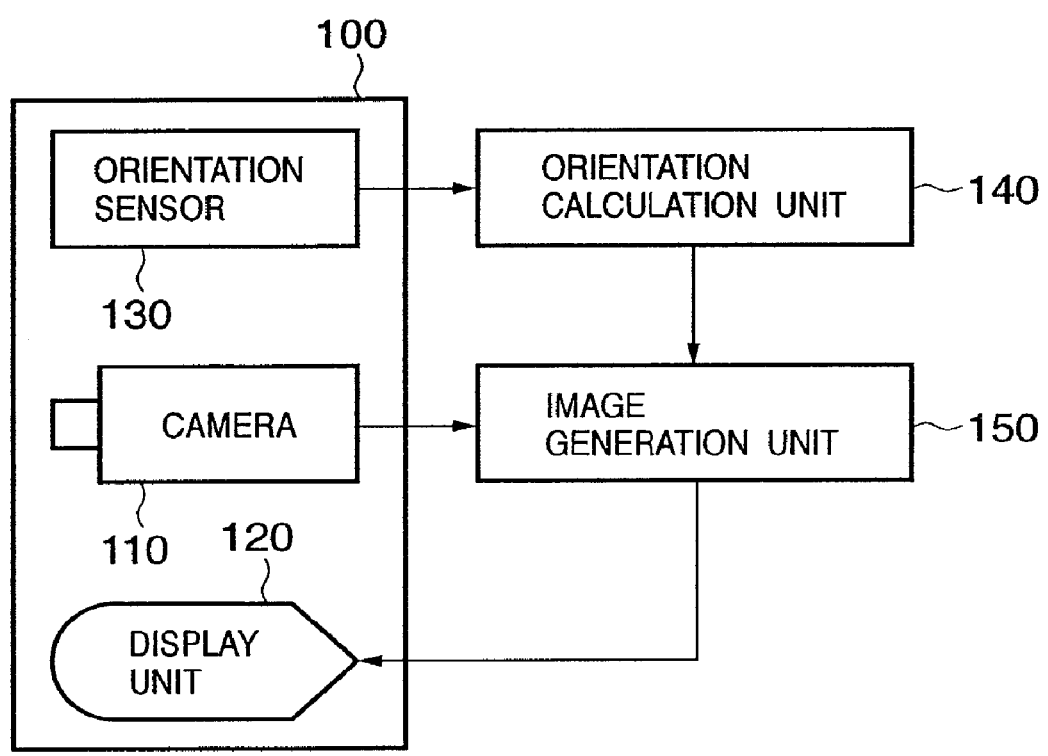
FIG. 1 is a block diagram showing the functional arrangement of a general image display apparatus that presents mixed reality.
Figure 4:
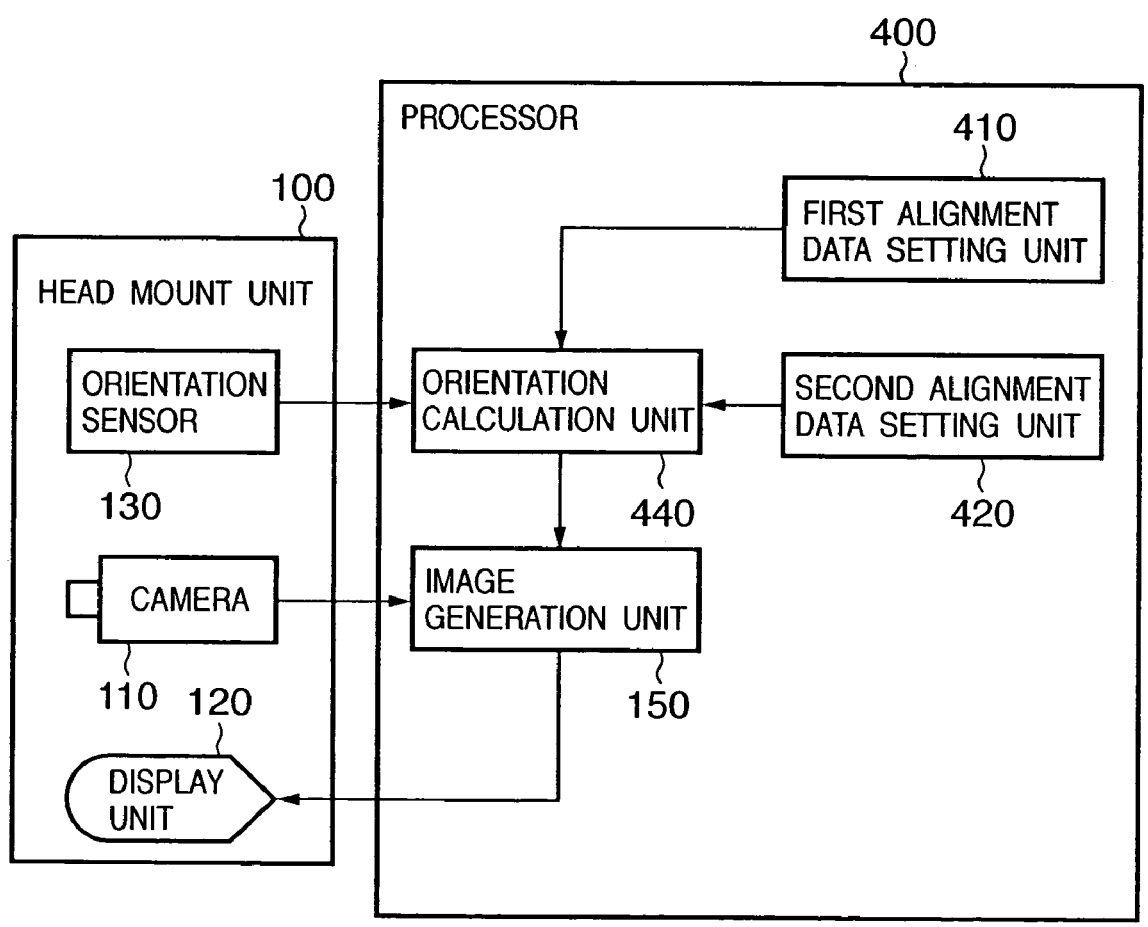
FIG. 4 is a block diagram showing the functional arrangement of an image display apparatus according to the first embodiment of the present invention.

FIG. 4 shows the apparatus arrangement of an image display apparatus in this embodiment. As shown in FIG. 4, the image display apparatus of this embodiment adopts an arrangement having an orientation calculation unit 440 as a building component corresponding to the orientation calculation unit 140 in the image display apparatus shown in FIG. 1. First and second alignment data setting units 410 and 420 are added as building components. Note that the operations of the head-mount unit 100, camera 110, display unit 120, orientation sensor 130, and image generation unit 150 are the same as those in the image display apparatus shown in FIG. 1, and a description thereof will be omitted. In this embodiment, an arrangement other than the head-mount unit 100 will be handled as a processor 400.

Figure 2:
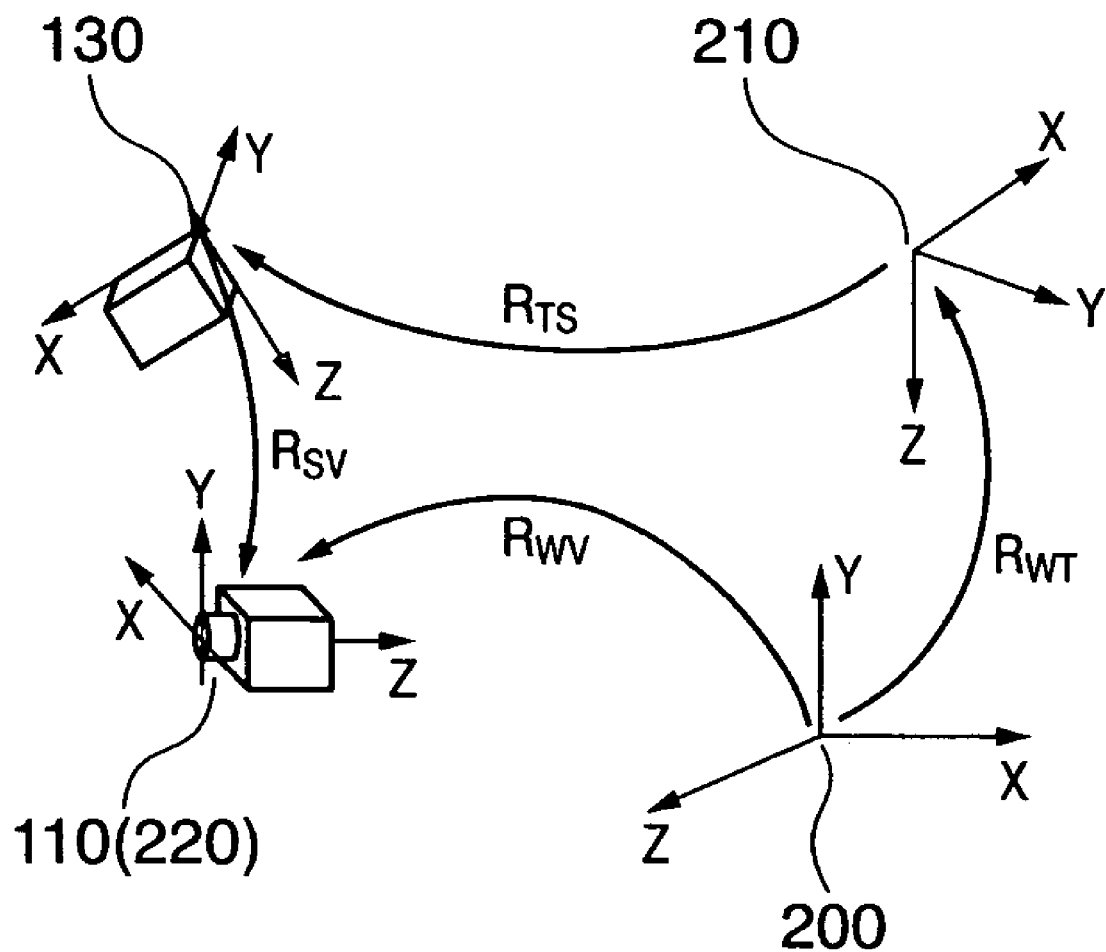
FIG. 2 is a view for explaining the method of calculating the orientation of a camera on a reference coordinate system.
Figure 3:
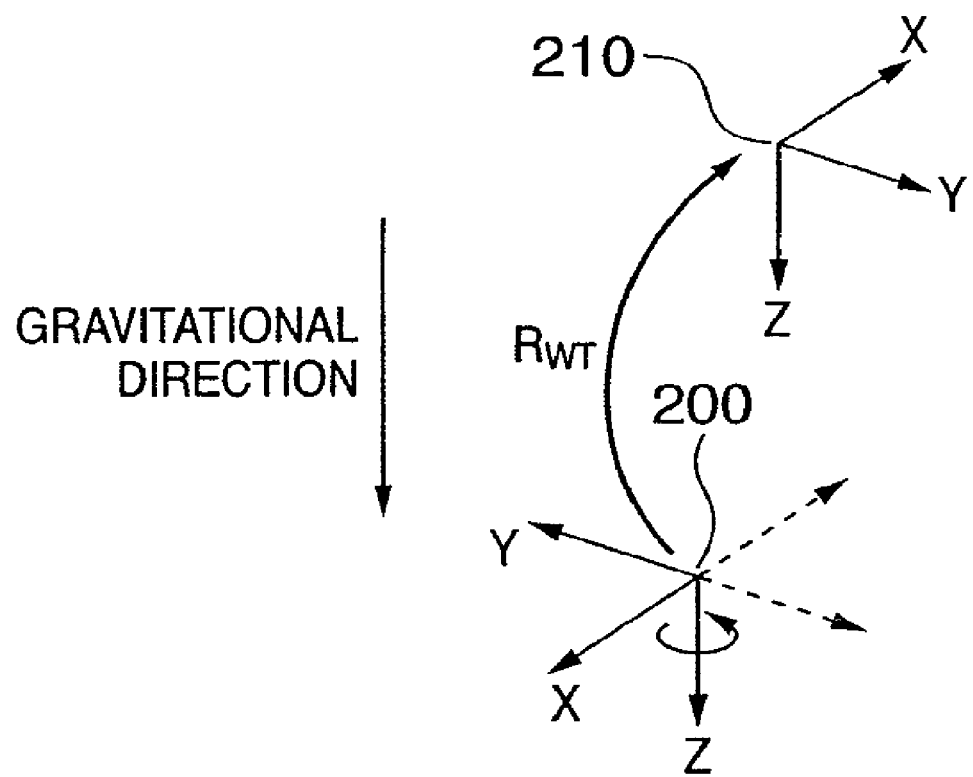
FIG. 3 is a view for explaining the relationship between the reference coordinate system and a sensor coordinate system in the conventional method.

The orientation calculation unit 440 holds, in its internal memory (not shown), first alignment data which represents the gravitational direction on the reference coordinate system 200, and second alignment data which represents a difference angle (a rotation angle about the axis of the gravitational direction (gravitational axis)) in the azimuth direction between the sensor coordinate system 210 and reference coordinate system 200. Also, the internal memory holds, as a known value, the coordinate conversion matrix $R_{SV}$ (i.e., offset data) required to convert the orientation of the orientation sensor 130 into that of the camera 110, since the relative orientation between the orientation sensor 130 and camera 110 remains the same. The orientation calculation unit 440 calculates the coordinate conversion matrix $R_{WT}$, which has been explained using FIG. 2, using the first and second alignment data held by the internal memory. The practical configuration of the first and second alignment data, and the method of calculating $R_{WT}$ from the first and second alignment data will be described in detail later.

The orientation calculation unit 440 further calculates $R_{WV}$ based on equation (A) using calculated $R_{WT}$, $R_{SV}$ held by the internal memory, and $R_{TS}$ input from the orientation sensor 130, as in the orientation calculation unit 140, and outputs it to the image generation unit 150.

The first alignment data setting unit 410 executes a process for reading out the first alignment data recorded in an external storage device (not shown), and setting it in the internal memory of the orientation calculation unit 440.

The second alignment data setting unit 420 has a command input unit (not shown) that accepts a command input from an operator, and executes a process for changing the second alignment data value held in the internal memory of the orientation calculation unit 440 in accordance with the input command.

Note that the orientation calculation unit 440, first and second alignment data setting unit 410 and 420, and image generation unit 150, which form the processor 400 in FIG. 4, may be configured as independent devices, or some or all of these units may be implemented by software to be executed by CPUs of one or a plurality of computers, thus implementing their functions. In this embodiment, all of the respective units (orientation calculation unit 440, first and second alignment data setting unit 410 and 420, and image generation unit 150) are implemented by software, and are executed in a single computer.

Figure 5:
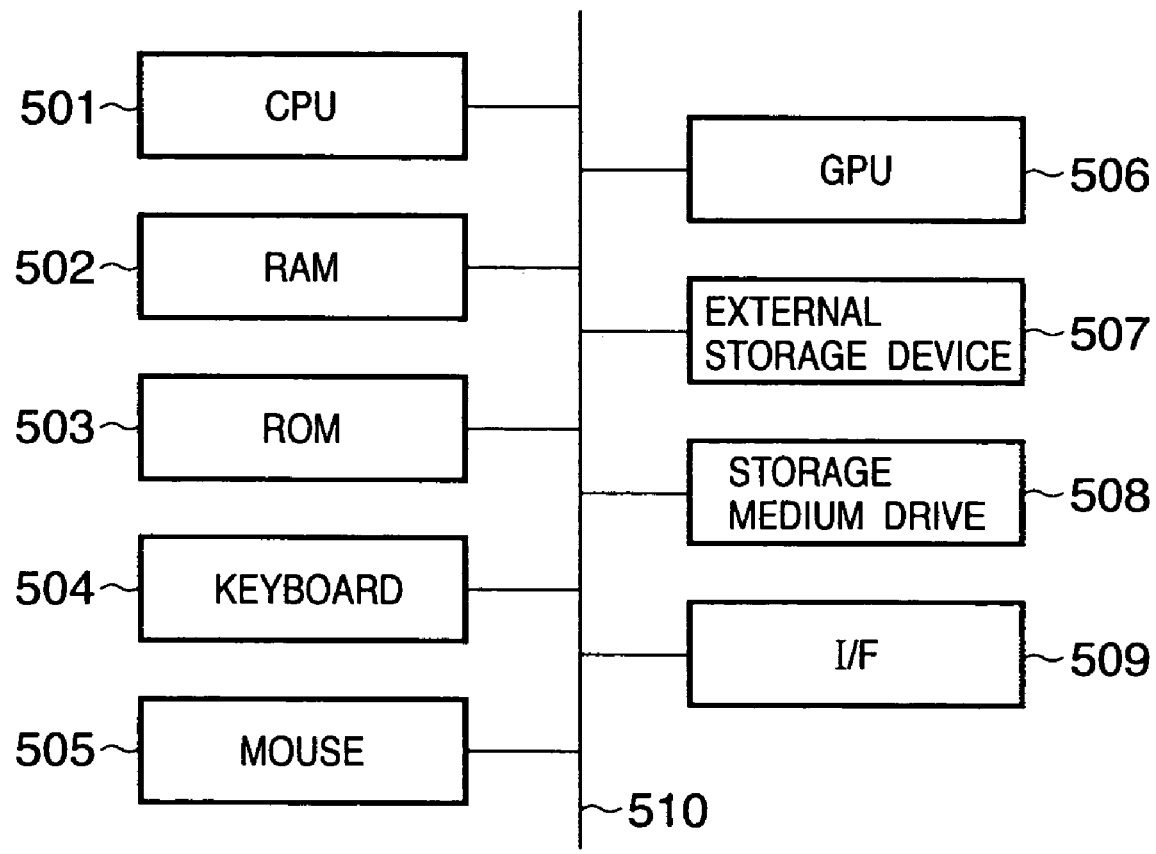
FIG. 5 is a block diagram showing the basic arrangement of a computer which can be used as a processor in the embodiment of the present invention.

FIG. 5 shows an example of the basic arrangement of a computer which implements the functions of the orientation calculation unit 440, first and second alignment data setting unit 410 and 420, and image generation unit 150 by executing software, and can be used as the processor 400.

A CPU 501 controls the overall computer using programs and data stored in a RAM 502 and ROM 503, and serves as the orientation calculation unit 440, first and second alignment data setting unit 410 and 420, and image generation unit 150 by executing software programs that implement these units.

The RAM 502 has an area for temporarily storing programs and data loaded from an external storage device 507 and storage medium drive 508, and a work area required for the CPU 501 to execute various processes. For example, the RAM 502 serves as the internal memory (not shown) of the aforementioned orientation calculation unit 440.

The ROM 503 stores software programs, which are generally executed by the computer upon startup, setting data, and the like. A keyboard 504 and mouse 505 are examples of the aforementioned input device (not shown), and the operator can input various instructions to the CPU 501 using these devices. For example, the keyboard 504 and mouse 505 serve as the command input unit (to be described later) of the second alignment data setting unit 420.

A GPU (Graphics Processing Unit) 506 is a processor used to execute a graphic process, and also has an image output function to a display device such as a CRT, liquid crystal monitor, or the like. In this embodiment, the GPU 506 outputs an image onto the display unit 120.

The external storage device 507 serves as a large-capacity information storage device such as a hard disk or the like, and saves an OS (operating system), software programs which implement the orientation calculation unit 440, first and second alignment data setting units 410 and 420, and image generation unit 150, and the like. The external storage device 507 also saves information which will be described as known information in this embodiment.

The storage medium drive 508 reads out programs and data stored in a removable storage medium such as a CD-ROM, DVD-ROM, or the like in accordance with an instruction from the CPU 501, and outputs them to the RAM 502 and external storage device 507.

An I/F 509 is used to connect the orientation sensor 130 and camera 110, whose outputs are fetched by the RAM 502 via the I/F 508. A bus 510 interconnects the respective units in the computer.

Figure 6:
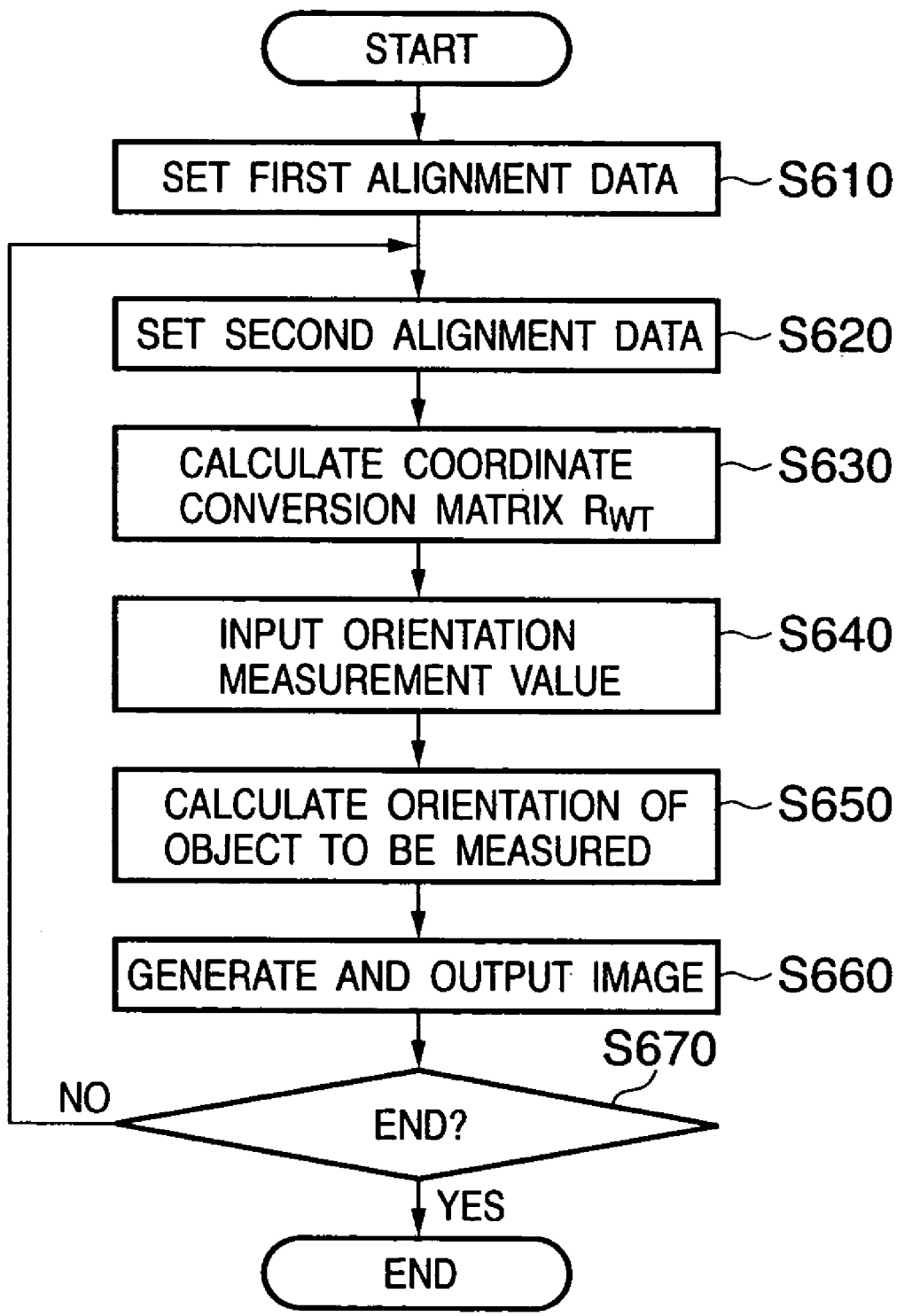
FIG. 6 is a flowchart showing the process to be executed by the image display apparatus according to the first embodiment of the present invention.

FIG. 6 is a flowchart of the process of the image display apparatus in this embodiment, which is implemented by the CPU 501 by executing software programs. Assume that software programs for implementing the functions of the orientation calculation unit 440, first and second alignment data setting units 410 and 420, and image generation unit 150 have already been loaded from the external storage device 507, storage medium drive 508, and the like onto the RAM 502 prior to execution of the process shown in FIG. 6.

In step S610, the first alignment data setting unit 410 reads out the first alignment data saved in, e.g., a storage medium inserted into the storage medium drive 508, and sets its value in a predetermined variable defined on the RAM 502. The first alignment data is formed of a three-dimensional (3D) vector $gw=(gw_x, gw_y, gw_z)$ indicating the gravitational direction on the reference coordinate system. Note that the storage medium in the storage medium drive 508 pre-stores the value of the 3D vector gw according to the design of the reference coordinate system 200 as the first alignment data in the form of, e.g., a data file or the like according to a predetermined data format, and this value can be changed as needed.

When the operator inputs a command via the command input unit, the second alignment data setting unit 420 changes the value of the second alignment data held in a predetermined variable defined on the RAM 502 in accordance with the input command in step S620. The second alignment data is formed of one scalar quantity $\phi_{WT}$ which represents a difference angle (a rotation angle about the axis of the gravitational direction (gravitational axis)) in the azimuth direction between the sensor coordinate system 210 and reference coordinate system 200. A command can be input by incrementing the value of $\phi_{WT}$ by a prescribed value (e.g., 1°) by clicking the right button of the mouse 505, by decrementing the value of $\phi_{WT}$ by the prescribed value by clicking the left button of the mouse 505, by directly inputting an increment/decrement of $\phi_{WT}$ using a ten-key pad of the keyboard 504, or the like.

The operator can interactively adjust the second alignment data using the mouse 505 or keyboard 504 while observing an adjustment image (an image formed by superimposing a virtual image onto an actually captured image) which is displayed on the display unit 120 by the image generation unit 150, so as to attain accurate registration between the actually captured image and virtual image. This process can be done very easily since the number of variables to be changed is one, and the degree of freedom of that variable is 1.

Upon first execution of step S620, since a conversion $R_1$ (to be described later) required to display an adjustment image has not been calculated yet, the flow immediately advances to step S630 without checking, e.g., the presence/absence of a user's input.

In step S630, the orientation calculation unit 440 calculates the coordinate conversion matrix $R_{WT}$ required to convert the orientation on the sensor coordinate system 210 into that on the reference coordinate system 200 using the first and second alignment data held by the RAM 502. Details of this calculation process will be explained below.

Let gs be the 3D vector which represents the gravitational direction on the sensor coordinate system 210. Since the Z-axis of the sensor in this embodiment indicates the gravitational direction, gs=(0, 0, 1). In this embodiment, the value gs of held in advance by the RAM 502 as a known value.

Initially, the orientation calculation unit 440 calculates, based on an inner product gs·gw of the vector gs indicating the gravitational direction on the sensor coordinate system and the first alignment data gw as a vector indicating the gravitational direction on the reference coordinate system 200, an angle β the two vectors make. Also, the unit 440 calculates, based on an outer product of gs and the first alignment data gw, a normal vector n=gs×gw to a plane defined by the two vectors. If the value β is 180° (i.e., if gw is substantially equal to (0, 0, −1) in this embodiment), the value n becomes unstable. Hence, in such case, an appropriate constant vector (e.g., (0, 1, 0) in this embodiment) perpendicular to gs is set as the normal vector n.

The orientation calculation unit 440 then calculates a coordinate conversion matrix $R_1$ that performs coordinate conversion having the normal vector n as a rotation axis and the angle β as a rotation angle. That is, the conversion $R_1$ is that between the gravitational direction gs of the sensor coordinate system and the gravitational direction gw of a world coordinate system. Since the calculation method of the coordinate conversion matrix when the rotation axis and rotation angle are given is known to those who are skilled in the art, a detailed description thereof will be omitted.

The orientation calculation unit 440 calculates a coordinate conversion matrix $R_2$ that performs coordinate conversion having the first alignment data gw as a rotation axis and the second alignment data $\phi_{WT}$ as a rotation angle. Since the calculation method of the coordinate conversion matrix when the rotation axis and rotation angle are given is known to those who are skilled in the art, a detailed description thereof will be omitted.

Finally, the orientation calculation unit 440 calculates the coordinate conversion matrix $R_{WT}$ by a product of $R_2$ and $R_1$, that is:

$$R_{WT}=R_2 \cdot R_1 \quad (C)$$

With the above process, the coordinate conversion matrix $R_{WT}$ is calculated in step S630.

In step S640, the orientation calculation unit 440 receives an orientation measurement value $R_{TS}$ from the orientation sensor 130 via the I/F 509.

In step S650, the orientation calculation unit 440 calculates $R_{WV}$ (i.e., the orientation of the camera 110 on the reference coordinate system 200) based on equation (A) using $R_{WT}$ calculated in step S630, $R_{TS}$ input in step S640, and $R_{SV}$ held as a known value.

In step S660, the image generation unit 150 receives an actually captured image from the camera 110 via the I/F 509, superimposes and renders a virtual image on this actually captured image on the basis of the orientation of the camera 110 calculated in step S650 and the position of the camera 110 input from position measurement means (not shown), and outputs a composite image.

In step S670, the CPU 501 checks the presence/absence of a program end instruction. If no end instruction is detected, the CPU 501 repeats the processes in step S620 and subsequent steps. If an end instruction is detected, the CPU 501 quits execution of the program.

With the above process, alignment data required to attain conversion from the sensor coordinate system into the reference coordinate system can be easily set without limiting the degree of freedom in design of the reference coordinate system.

Second Embodiment

The first embodiment has explained a case wherein an orientation sensor such as TISS-5-40 or InertiaCube2 which as the gravitational direction as the Z-axis is used. However, the scope of the present invention is no limited to the arrangement using such specific sensor. The orientation measurement method of the present invention can be applied to any other sensors as long as an orientation sensor has a sensor coordinate system which is set in association with the gravitational direction.

This embodiment will explain a case wherein the orientation measurement method of the present invention is applied to an image display apparatus that presents mixed reality and comprises an orientation sensor which is designed to have the gravitational direction as an axis other than the Z-axis.

Figure 7:
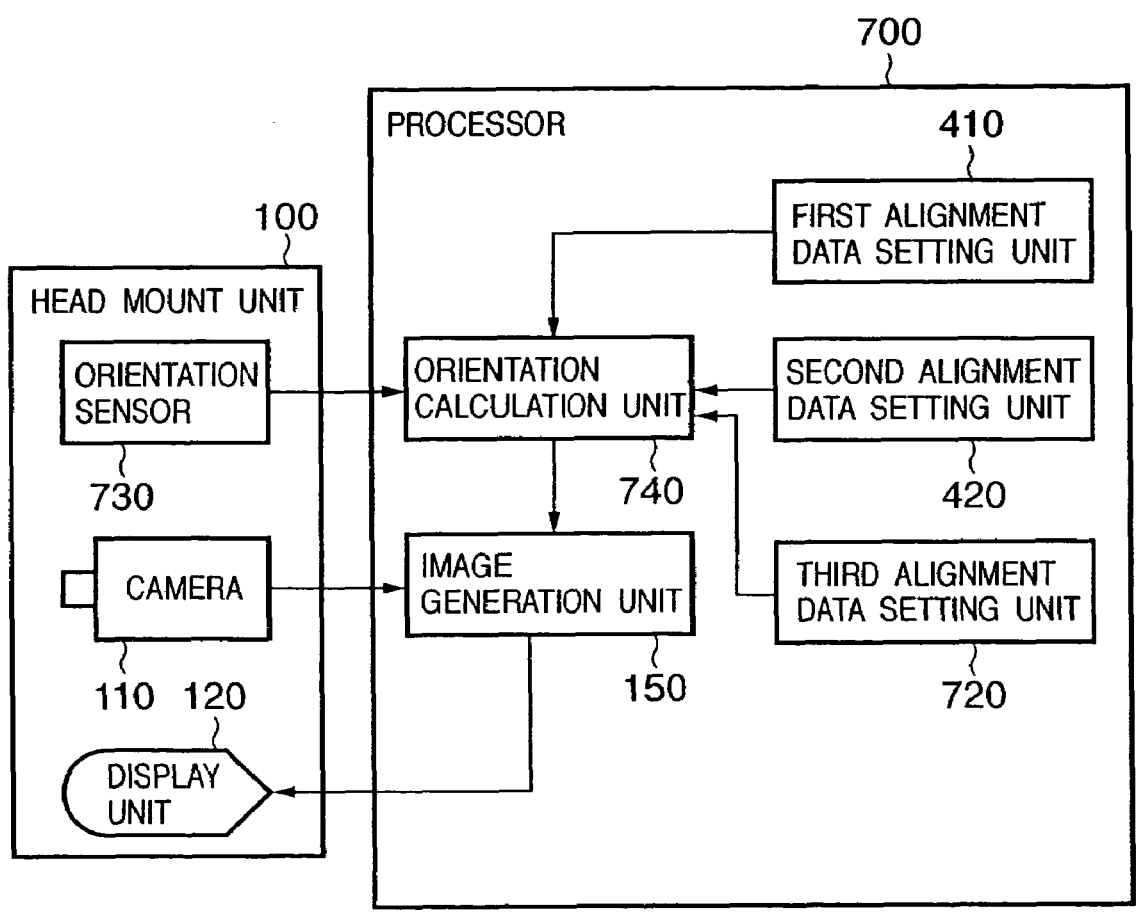
FIG. 7 is a block diagram showing the functional arrangement of an image display apparatus according to the second embodiment of the present invention.

FIG. 7 shows the apparatus arrangement of an image display apparatus in this embodiment. As shown in FIG. 7, the image display apparatus of this embodiment adopts an arrangement which has an orientation calculation unit 740 as a building component corresponding to the orientation calculation unit 440 in the image display apparatus shown in FIG. 4, and an orientation sensor 730 as a building component corresponding to the orientation sensor 130. Also, a third alignment data setting unit 720 is added as a building component. Note that the operations of the head-mount unit 100, camera 110, display unit 120, image generation unit 150, and first and second alignment data setting units 410 and 420 are the same as those in the image display apparatus shown in FIG. 4, and a description thereof will be omitted.

The orientation sensor 730 is designed to have the gravitational direction as an axis other than the Z-axis. The orientation sensor 730 measures the orientation of the orientation sensor 730 itself on the sensor coordinate system, and outputs orientation measurement values of three degrees of freedom. This embodiment will give the following explanation under the assumption that the gravitational direction on the sensor coordinate system of the orientation sensor 730 agrees with a −Y-axis.

The orientation calculation unit 740 holds, in its internal memory, first alignment data indicating the gravitational direction on the reference coordinate system 200, and second alignment data $\Phi_{WT}$ which represents a difference angle (a rotation angle about the axis of the gravitational direction (gravitational axis)) in the azimuth direction between the sensor coordinate system 210 and reference coordinate system 200, as in the orientation calculation unit 440. Also, the internal memory holds, as a known value, the coordinate conversion matrix $R_{SV}$ (i.e., offset data) required to convert the orientation of the orientation sensor 730 into that of the camera 110, as in the orientation calculation unit 440. The orientation calculation unit 740 further holds third alignment data indicating the gravitational direction of the sensor coordinate system 210 in addition to these data. The orientation calculation unit 740 calculates the coordinate conversion matrix $R_{WT}$ using the first, second, and third alignment data held by the internal memory. The practical configuration of the third alignment data and the method of calculating $R_{WT}$ from the first, second, and third alignment data will be described in detail later.

The orientation calculation unit 740 further calculates $R_{WV}$ based on equation (A) using calculated $R_{WT}$, $R_{SV}$ held by the internal memory, and $R_{TS}$ input from the orientation sensor 130, as in the orientation calculation unit 440, and outputs it to the image generation unit 150.

The third alignment data setting unit 720 executes a process for reading out the third alignment data recorded in an external storage device (not shown), and setting it in the internal memory of the orientation calculation unit 740.

Note that the orientation calculation unit 740, first, second, and third alignment data setting unit 410, 420, and 720, and image generation unit 150, which form a processor 700 in FIG. 7, may be configured as independent devices, or some or all of these units may be implemented by software to be executed by CPUs of one or a plurality of computers, thus implementing their functions. In this embodiment, all of the respective units (orientation calculation unit 740, first, second, and third alignment data setting unit 410, 420, and 720, and image generation unit 150) are implemented by software, and are executed in a single computer.

A computer, which implements the functions of the orientation calculation unit 740, first, second, and third alignment data setting unit 410, 420, and 720, and image generation unit 150 by executing software, and can be used as the processor 400, has the arrangement shown in FIG. 5 as in the first embodiment.

Figure 8:
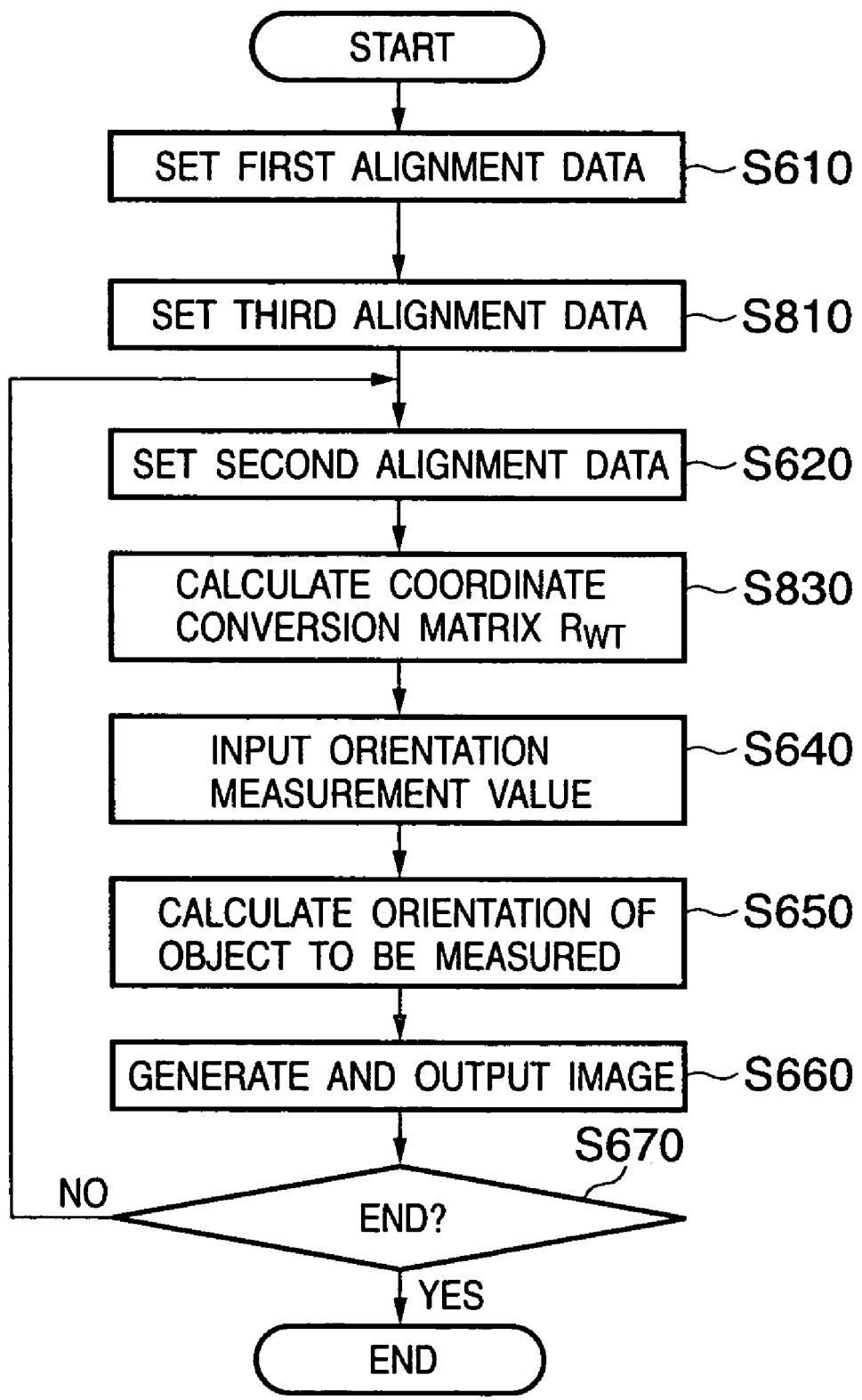
FIG. 8 is a flowchart showing the process to be executed by the image display apparatus according to the second embodiment of the present invention.

FIG. 8 is a flowchart of the process of the image display apparatus in this embodiment, which is implemented by the CPU 501 by executing software programs. Assume that software programs for implementing the functions of the orientation calculation unit 740, first, second, and third alignment data setting units 410, 420, and 720, and image generation unit 150 have already been loaded from the external storage device 507, storage medium drive 508, and the like onto the RAM 502 prior to execution of the following process. Note that the processing contents of steps (S610, S620, S640, S650, S660, S670) denoted by the same step numbers as those in FIG. 6 are the same as those in the first embodiment, and a description thereof will be omitted.

In step S810, the third alignment data setting unit 720 reads out the third alignment data saved in, e.g., a storage medium inserted into the storage medium drive 508, and sets its value in a predetermined variable defined on the RAM 502. The third alignment data is formed of a 3D vector $gs=(gs_x, gs_y, gs_z)$ indicating the gravitational direction on the sensor coordinate system 210. Note that the storage medium pre-stores the value of the 3D vector gs ((0, −1, 0) in this embodiment) according to the specification of the orientation sensor 730 as the third alignment data in the form of, e.g., a data file or the like according to a predetermined data format, and this value can be changed as needed.

In step S830, the orientation calculation unit 740 calculates the coordinate conversion matrix $R_{WT}$ required to convert the orientation on the sensor coordinate system 210 into that on the reference coordinate system 200 using the first, second, and third alignment data held by the RAM 502. The difference from step S630 is that the value gs is not held in advance in the RAM 502 as a known value, but is set by the third alignment data setting unit 720 in step S810, and other processing contents are the same as those in step S630.

With the above process, alignment data required to attain conversion from the sensor coordinate system into the reference coordinate system can be easily set irrespective of the specification of the sensor coordinate system unique to the orientation sensor.

Third Embodiment

In the above embodiments, the orientation measurement apparatus and method of the present invention are applied to the image display apparatus that presents mixed reality. However, the orientation measurement apparatus and method of the present invention can be used in various other applications that measure the orientation of an object using an orientation sensor.

Figure 9:
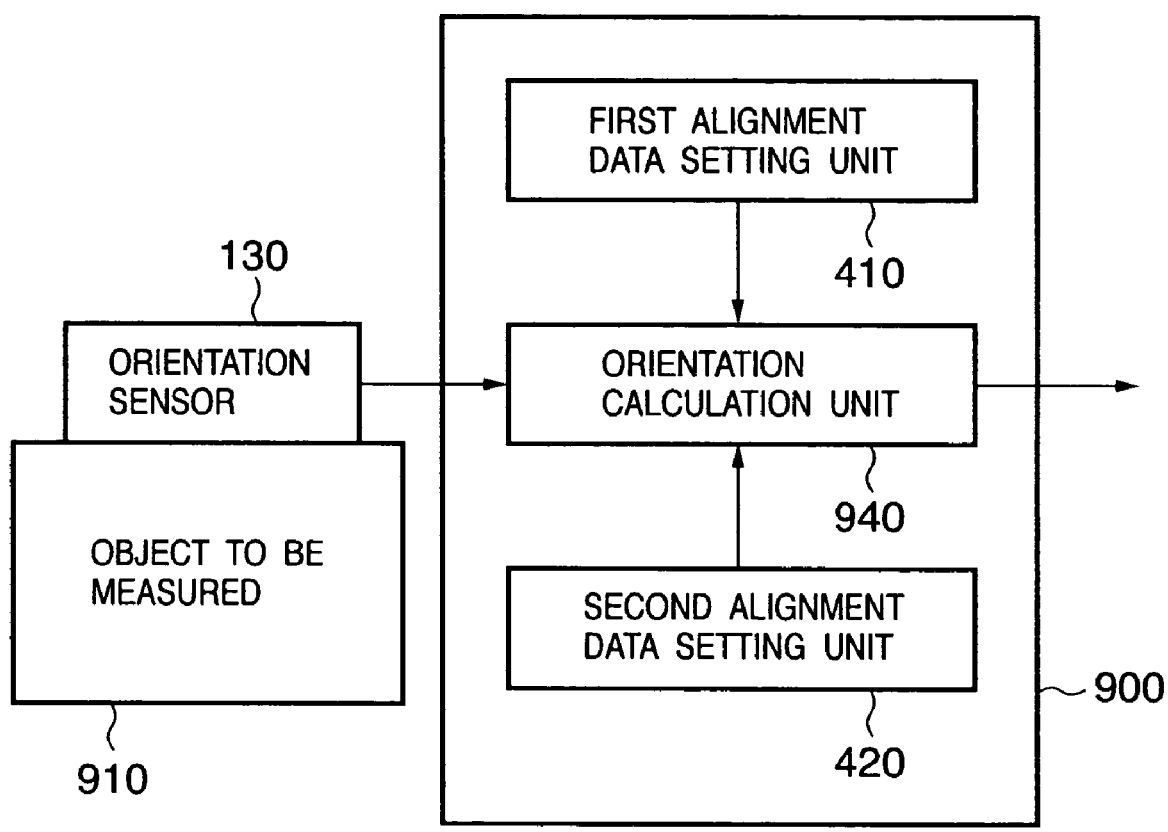
FIG. 9 is a block diagram showing the functional arrangement of an orientation measurement apparatus according to the third embodiment of the present invention.

FIG. 9 shows an example of the apparatus arrangement of an orientation measurement apparatus according to this embodiment. As shown in FIG. 9, the orientation measurement apparatus of this embodiment comprises a computer 900 and orientation sensor 130, which latter is the same as that in the first embodiment.

The orientation sensor 130 is fixed to an arbitrary object 910 to be measured.

The computer 900 has an orientation calculation unit 940 as a building component corresponding to the orientation calculation unit 440 in the first embodiment. Also, the computer 900 has first and second alignment data setting units 410 and 420 as building components as in the first embodiment.

The orientation calculation unit 940 calculates the coordinate conversion matrix $R_{WT}$ from first and second alignment data set by the first and second alignment data setting unit 410 and 420, as in the orientation calculation unit 440. Furthermore, the orientation calculation unit 940 calculates an orientation $R_{WV}$ of the object 910 to be measured on the reference coordinate system on the basis of equation (A) using calculated $R_{WT}$, $R_{SV}$ held by the internal memory, and $R_{TS}$ input from the orientation sensor 130, as in the orientation calculation unit 440.

In the first embodiment, the orientation calculation unit 440 outputs the calculated orientation $R_{WV}$ to the image generation unit 150. In this embodiment, the orientation calculation unit 940 outputs the calculated orientation $R_{WV}$ to an arbitrary device via an I/F (not shown). Alternatively, the orientation calculation unit 940 outputs the calculated orientation $R_{WV}$ to an arbitrary application program, which is running parallelly in the computer 900.

In this embodiment, another application generates and displays an adjustment image required to adjust the second alignment data. In this case, parameters required to adjust the second alignment data (e.g., the calculated orientation $R_{WV}$ and the like) are supplied to that application.

With the above arrangement, the orientation of an object to be measured on the reference coordinate system can be acquired in various applications that measure the orientation of an object using an orientation sensor.

<Modification 1>

In the above embodiments, the first alignment data setting unit 410 acquires the value of first alignment data to be set in a variable on the RAM 502 by reading out first alignment data saved in the storage medium drive 508. However, the method of acquiring the value of the first alignment data is not limited to such specific method. For example, the value of the first alignment data may be acquired by directly coding that value in a software program used to implement the function of the first alignment data setting unit 410. The operator may input that value via the keyboard 504 or the like in step S610. The value may be stored in the external storage device 507, or may be acquired from another computer via a computer network.

<Modification 2>

In the above embodiments, a computer independent from the orientation sensor 130 (730) comprises the orientation calculation unit 440 (740). Alternatively, the effect of the present invention can be obtained when the orientation sensor 130 (730) itself or its auxiliary device has an equivalent function. In this case, the orientation sensor or its auxiliary device must have a function of receiving alignment data from required ones of the first to third alignment data setting units.

<Modification 3>

In the above embodiments, the coordinate conversion matrix $R_1$ is calculated on the basis of the vector gw which is set as the first alignment data by the first alignment data setting unit 410 and indicates the gravitational direction on the reference coordinate system 200, and the vector gs which indicates the gravitational direction on the sensor coordinate system 210. However, the first alignment data need not always indicate the gravitational direction gw on the reference coordinate system 200. For example, a calculation device that calculates the coordinate conversion matrix $R_1$ from the gravitational direction gw on the reference coordinate system 200 and the gravitational direction gs on the sensor coordinate system 210 may be independently available, and the first alignment data setting unit 410 may set the coordinate conversion matrix $R_1$ in the orientation calculation unit 440 as the first alignment data. In this case, the process for calculating the coordinate conversion matrix $R_1$ from gw and gs is omitted in step S630.

Likewise, a calculation device that calculates the rotation axis (normal vector) n and rotation angle $\beta$ on the basis of the gravitational direction gw on the reference coordinate system 200 and the gravitational direction gs on the sensor coordinate system 210 may be independently available, and the first alignment data setting unit 410 may set the rotation axis n and rotation angle $\beta$ in the orientation calculation unit 440 as the first alignment data. In this case, the process for calculating the rotation axis n and rotation angle $\beta$ from the gravitational direction gw on the reference coordinate system 200 and the gravitational direction gs on the sensor coordinate system 210 is omitted in step S630.

In this way, when another device calculates the coordinate conversion matrix $R_1$ or the rotation axis n and rotation angle $\beta$, the orientation calculation unit supplies parameters (gs, gw) required in calculations to that device, and acquires the calculation result from that device.

In this modification, the same effect can be obtained even when the operator sets $R_1$ or n and $\beta$ derived by another means in the first alignment data setting unit 410. Also, as can be seen from the above description, $R_1$ can be designated by another description method that can express a rotation matrix (e.g., Euler angle expression including roll, pitch, and yaw angles).

As described above, according to the present invention, since alignment data required to convert the orientation on the sensor coordinate system into that on an arbitrary reference coordinate system can be easily set, an application having a unique reference coordinate system can easily attain accurate orientation measurement.

Another Embodiment

The aforementioned third embodiment has explained only the orientation measurement apparatus that uses the orientation measurement method described in the first embodiment. Also, the orientation measurement method described in the second embodiment can be similarly applied. In this case, the computer 900 includes the third alignment data setting unit 720.

The aforementioned embodiments have explained the arrangement including the head-mount unit or orientation sensor. However, an apparatus need not have any orientation sensor or camera as long as measurement values and a captured image can be obtained. Also, if an image display function is not required, neither a display unit nor an image generation unit are required like in the third embodiment.

The above embodiments have explained only the processor configured by a single device. However, the equivalent functions may be implemented by a system including a plurality of devices.

Note that the present invention includes a case wherein the equivalent functions are achieved by supplying a software program that implements the functions of the aforementioned embodiments (programs corresponding to one or more flowcharts shown in FIGS. 6 and 8 in the embodiments) directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

The objects of the present invention are also achieved by supplying a storage medium (or recording medium), which records a program code of a software program that can implement the functions of the above-mentioned embodiments to a system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-341630 filed Sep. 30, 2003, which is hereby incorporated by reference herein.

What is claimed is:

1. A data conversion method for converting orientation data on a sensor coordinate system defined by an orientation sensor into orientation data on a reference coordinate system, which is different from the sensor coordinate system, with each axis of the reference coordinate system being defined independently of a gravitational direction, comprising:

a first setting step of setting first alignment data which represents the gravitational direction on the reference coordinate system;

a second setting step of setting second alignment data indicating a difference angle in an azimuth direction between the sensor coordinate system and reference coordinate system;

a first calculation step of calculating a first coordinate conversion matrix for converting the gravitational direction on the sensor coordinate system into the gravitational direction on the reference coordinate system, wherein a rotation angle for the first coordinate conversion matrix is defined as an angle made by a first vector indicating the first alignment data and a second vector indicating the gravitational direction on the sensor coordinate system, and a rotation axis for the first coordinate conversion matrix is defined as a normal vector to a plane formed by the first and second vectors;

a second calculation step of calculating a second coordinate conversion matrix for which a rotation angle is defined as the second alignment data and a rotation axis is defined as the first alignment data;

a third calculation step of calculating a third coordinate conversion matrix for converting an orientation on the sensor coordinate system into an orientation on the reference coordinate system as a product of the first and second coordinate conversion matrices;

an input step of inputting orientation data on the sensor coordinate system; and a conversion step of convertng the orientation data on the sensor coordinate system input in the input step into orientation data on the reference coordinate system using the third coordinate conversion matrix.

2. The method according to claim 1, further comprising a step of setting third alignment data which represents the gravitational direction on the sensor coordinate system.

3. The method according to claim 1, wherein one of coordinate axes of the sensor coordinate system agrees with the gravitational direction.

4. The method according to claim 1, wherein the orientation data input in the input step represents an orientation of the orientation sensor, the conversion step further includes a step of converting the orientation data which represents the orientation of the orientation sensor into orientation data which represents an orientation of an image sensing unit to which the orientation sensor is attached, and said method further comprises:

an image generation step of generating a superimposed image formed by superimposing an image, generated using position data of the image sensing unit on the reference coordinate system, and the orientation data of the image sensing unit on the reference coordinate system, which is converted in the conversion step, on an actually captured image captured by the image sensing unit; and a display step of displaying the superimposed image.

5. A program stored on a computer-readable storage medium, said program making a computer execute a data conversion method of claim 1.

6. A data conversion apparatus for converting orientation data on a sensor coordinate system defined by an orientation sensor into orientation data on a reference coordinate system, which is different from the sensor coordinate system, with each axis of the reference coordinate system being defined independently of a gravitational direction, comprising:

a first setting unit adapted to set first alignment data which represents the gravitational direction on the reference coordinate system;

a second setting unit adapted to set second alignment data indicating a difference angle in an azimuth direction between the sensor coordinate system and reference coordinate system;

a first calculation unit adapted to calculate a first coordinate conversion matrix for converting the gravitational direction on the sensor coordinate system into the gravitational direction on the reference coordinate system, wherein a rotation angle for the first coordinate conversion matrix is defined as an angle made by a first vector indicating the first alignment data and a second vector indicating the gravitational direction on the sensor coordinate system, and a rotation axis for the first coordinate conversion matrix is defined as a normal vector to a plane formed by the first and second vectors;

a second calculation unit adapted to calculate a second coordinate conversion matrix for which a rotation angle is defined as the second alignment data and a rotation axis is defined as the first alignmment data;

a third calculation unit adapted to calculate a third coordinate conversion matrix for converting an orientation on the sensor coordinate system into an orientation on the reference coordinate system as a product of the first and second coordinate conversion matrices;

an input unit adapted to input orientation data on the sensor coordinate system; and a conversion unit adapted to convert the orientation data on the sensor coordinate system input by said input unit into orientation data on the reference coordinate system using the third coordinate conversion matrix.

7. The apparatus according to claim 6, wherein the orientation data input by said input unit represents an orientation of the orientation sensor, said conversion unit further comprises converting unit adapted to convert the orientation data which represents the orientation of the orientation sensor into orientation data which represents an orientation of an image sensing unit to which the orientation sensor is attached, and said apparatus further comprises:

an image generation unit adapted to generate a superimposed image formed by superimposing an image, generated using position data of the image sensing unit on the reference coordinate system, and the orientation data of the image sensing unit on the reference coordinate system, which is converted by said conversion unit, on an actually captured image captured by the image sensing unit; and a display unit adapted to display the superimposed image.

* * * * *

UNITED STATES PATENT AND TRADEMARK OFFICE
CERTIFICATE OF CORRECTION

PATENT NO. : 7,414,596 B2  Page 1 of 1
APPLICATION NO. : 10/952876
DATED : August 19, 2008
INVENTOR(S) : Kiyohide Satoh et al.

It is certified that error appears in the above-identified patent and that said Letters Patent is hereby corrected as shown below:

COLUMN 1:
    Line 12, "aims" should read -- aim --.

COLUMN 2:
    Line 9, "InertiCube2," should read -- InertiaCube2, --.

COLUMN 3:
    Line 58, "In case" should read -- In the case --.

COLUMN 6:
    Line 57, "advantageous" should read -- advantages --; and
    Line 62, "from" should read -- form --.

COLUMN 11:
    Line 17, "no" should read -- not --.

COLUMN 13:
    Line 18, "which latter" should read -- the latter of which --.

COLUMN 15:
    Line 33, "along" should read -- long --.

COLUMN 18:
    Line 31, "converting" should read -- a converting --.

Signed and Sealed this

Twenty-fourth Day of March, 2009

JOHN DOLL
*Acting Director of the United States Patent and Trademark Office*